United States Patent [19]

Tavlarides et al.

[11] Patent Number: 5,616,533
[45] Date of Patent: Apr. 1, 1997

[54] CHEMICALLY ACTIVE CERAMIC COMPOSITIONS WITH A THIOL AND/OR AMINE MOIETY

[75] Inventors: Lawrence L. Tavlarides, Fayetteville; Nandu Deorkar, Syracuse, both of N.Y.

[73] Assignee: Syracuse University, Syracuse, N.Y.

[21] Appl. No.: 313,349

[22] Filed: Sep. 27, 1994

[51] Int. Cl.$^6$ .................... B01J 20/10; C02F 1/42
[52] U.S. Cl. ................ 502/407; 502/405; 210/688
[58] Field of Search ............... 502/405, 407; 210/688

[56] References Cited

U.S. PATENT DOCUMENTS

| | | | |
|---|---|---|---|
| 3,886,080 | 5/1975 | Shucker et al. . | |
| 4,377,555 | 3/1983 | Hancock et al. | 423/6 |
| 4,421,654 | 12/1983 | Pleuddemann | 210/698 |
| 4,448,694 | 5/1984 | Plueddemann . | |
| 4,585,559 | 4/1986 | DeVoe et al. | 210/679 |
| 4,623,638 | 11/1986 | Hayatsu et al. . | |
| 4,752,398 | 6/1988 | Holbein et al. | 210/679 |
| 4,756,971 | 7/1988 | Virtanen et al. | 428/405 |
| 4,824,576 | 4/1989 | Sood et al. . | |
| 4,943,375 | 7/1990 | Bradshaw et al. . | |
| 4,952,321 | 8/1990 | Bradshaw et al. . | |
| 4,959,153 | 9/1990 | Bradshaw et al. . | |
| 4,968,434 | 11/1990 | Kaneko et al. | 210/682 |
| 4,975,379 | 12/1990 | Bradshaw et al. . | |
| 5,039,419 | 8/1991 | Bradshaw et al. | 210/502.1 |
| 5,078,978 | 1/1992 | Tarbet et al. | 423/22 |
| 5,120,443 | 6/1992 | Bruenning et al. | 210/638 |
| 5,175,110 | 12/1992 | Bradshaw et al. . | |
| 5,190,660 | 3/1993 | Lindoy et al. . | |
| 5,190,661 | 3/1993 | Bruening et al. . | |
| 5,316,683 | 5/1994 | Haesebroek et al. | 210/688 |

OTHER PUBLICATIONS

Nakamura et al., 15 *J. Nucl. Sci. and Tech.*, 829–834 (1978),

*Primary Examiner*—Glenn A. Caldarola
*Assistant Examiner*—In Suk Bullock
*Attorney, Agent, or Firm*—Nixon, Hargrave, Devans & Doyle

[57] ABSTRACT

Composite materials useful for removing metal ions from solutions such as aqueous waste streams comprise an inorganic ceramic support such as silica gel that has active hydroxyl groups. The support is reacted with a silane linking compound or with a titanizing agent. A chelating compound, which can be a thiol or an amine, is attached to the silane or to titanium atoms of the titanized surface of the support.

21 Claims, 5 Drawing Sheets

CHEMICALLY ACTIVE CERAMIC COMPOSITIONS WITH A THIOL AND/OR AMINE MOIETY

This invention was made with Government support under Contract #R818630-01-1, awarded by the Environmental Protection Agency. The Government has certain rights in the invention.

FIELD OF INVENTION

The present invention relates to novel chemically active ceramic compositions and their preparation and use for removing metal ions from solutions, especially aqueous waste streams.

BACKGROUND OF THE INVENTION

Many industries utilize heavy metals and/or rare earth metals in their manufacturing processes. Such use typically results in liquid (generally aqueous) waste streams that contain residues of the rare earth or heavy metals utilized in the given manufacturing process. For example, the waste streams resulting from electronics, electroplating, and photographic processes typically contain metal ions such as copper, nickel, zinc, chromium (III), chromium (VI), cadmium, aluminum, lead, antimony, silver and gold, amongst others in various aqueous solutions such as sulfates, chlorides, fluoroborates and cyanides. Because of the potential adverse effect of such substances on health and the environment, the removal of rare earth metals and heavy metal ions from aqueous waste streams is a problem of continuing significance.

For the purposes of the present invention, heavy metals will be defined generally as elements having atomic numbers greater than 20, as defined by the Periodic Chart of the Elements and are metallic at ambient conditions. Rare earth metals are defined as those heavy metals having atomic numbers 57 through 71 inclusive. Actinides are those heavy metals having atomic numbers greater than 89. For example, aluminum, arsenic, antimony, copper, nickel, zinc, chromium, cadmium, mercury, platinum, palladium and gold are all heavy metals typically found in the waste stream of common manufacturing processes. In addition, cesium and strontium (and other radioactive metals) are found in aqueous waste streams in the nuclear industry.

The conventional and predominant method of treatment of the waste streams described above is the precipitation of the metal ions in the form of hydroxides or carbonates. That method of removing heavy metals is largely undesirable because it results in a sludge that is difficult and/or expensive to remove and separate from the waste stream. Furthermore, the recovered sludge is typically deposited in a hazardous waste site, raising additional environmental concerns. Finally, it is difficult to separate the individual metal from the resultant sludge for recycling back into the manufacturing process. Other recovery methods include evaporation, reverse osmosis, ion exchange, electrolytic metal recovery, and solvent extraction. These methods, however, have varying levels of success and do not typically allow for the quick and inexpensive separation and removal of the individual metals from the waste streams.

Another common technique for the separation and recovery of rare earths is solvent extraction. However, the main difficulty in a solvent extraction recovery process arises from the low concentration at which these metal ions exist in the aqueous stream generated from hydrometallurgical processes. Also, the identical complexing behavior of all the rare earths due to their similar ionic sizes and chemistry limits the ability to separate out the individual rare earth metals from the sample collected in the solvent extraction process. See Nakamura, Tachimori and Sato, 15 *Journal of Nuclear Science and Technology,* 829–834 (1978).

A more recent method of removing metals from waste streams features using compositions which include chelating agents that are bound to inorganic carriers. Chelating agents, also known as multidented ligands, are compounds which are capable of complexing with various metal ions in solution where one chelation molecule has the capacity to attach a metal ion at two or more positions. Those chelating agents are molecules which contain one or more of the same donor atom (e.g., "electron sufficient" atoms such as oxygen, nitrogen, sulfur etc.) or two or more different donor atoms through which coordinate and/or covalent bonds are formed between the metal ion and chelating agent. One such composition is disclosed in U.S. Pat. No. 3,886,080 to Schucker et al. ("Schucker"). Schucker discloses a composition in which a chelating agent has been rendered immobile or insoluble by chemically coupling a chelating agent, selected from a defined group of chelates, by bonding the chelating agent to a silane coupling agent using a diazo linkage. The silane coupling agent, in turn, is bonded to the inorganic carrier.

The compositions defined by Schucker have many disadvantages. Initially, the method of making the compositions disclosed by Schucker inherently limits the types of compounds that can be utilized in the composition. For example, the only chelating agents that can be used are those compounds having an unsaturated ring structure. Furthermore, because the chelate and the silane coupling agent are bound by a diazo linkage, it is obvious that only compounds capable of forming such a linkage can be used to produce the composition. Furthermore, the Schucker process for making the compositions is a five step process. The large number of steps required can result in decreased capacities (i.e., the amount of metal the composition is capable of chelating) due to the aggregate inefficiency of the chemical reactions utilized to produce a given composition. Lastly, the Schucker compositions are not capable of separating individual metals and, therefore, are not useful in metal recovery processes which seek to recycle individual metals back into the manufacturing process from which they came. Accordingly, there exists a need for more cost efficient processes for the separation and removal of heavy metal and/or rare earth metals from waste streams by producing compositions having a variety of chelating agents which are specific and selective toward desired metal ions.

SUMMARY OF THE INVENTION

The present invention relates to chemically active ceramic compositions for separating heavy metal ions from solutions, especially aqueous waste streams. More particularly, the present invention relates to novel compositions that have very high capacities for chelating heavy and/or rare earth metals and can be readily designed to selectively remove individual metals. Furthermore, the present invention relates to methods of making and using those compositions.

One embodiment of the present invention comprises a composite material having the formula:

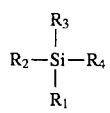  (I)

wherein at least one of $R_1$-$R_3$ is SUPPORT—O— and other of $R_1$-$R_3$ are the same or different and are unsubstituted or halosubstituted alkyl groups having 1–5 carbon atoms and $R_4$ is

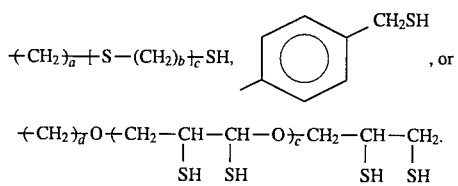, or

In the formula above, a is an integer from 1–20, b is an integer from 2–8, c is an integer from 0–5, and d is an integer from 1–5.

A second embodiment of the present invention comprises a composite material which contains the compounds of the following formulae:

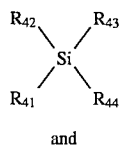

and

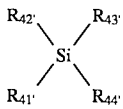

wherein
at least one of $R_{41}$-$R_{43}$ and one of $R_{41'}$-$R_{43'}$ are SUPPORT—O—
$R_{44}$ is —(CH$_2$)$_a$—[S—(CH$_2$)$_b$—]$_c$SH,
$R_{44'}$ is an amine; and
other of $R_{41}$-$R_{43}$ and $R_{41'}$-$R_{43'}$ are the same or different and are unsubstituted or halo-substituted alkyl groups having 1–5 carbon atoms, $R_{44}$ or $R_{44'}$, respectively.

A third embodiment of the present invention comprises a composition having the formula:

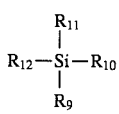  (II)

wherein
1) at least one of $R_9$, $R_{10}$ or $R_{11}$ is SUPPORT—O— and $R_{12}$ is

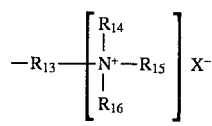

wherein:
a) $R_{13}$ is
i) an unsubstituted or lower aryl or lower alkyl substituted saturated hydrocarbon chain having 1–20 carbon atoms,

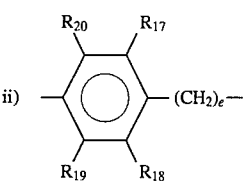

wherein $R_{17}$-$R_{20}$ are the same or different and are —H or —(CH$_2$)$_f$CH$_3$, where f is an integer of 0–20 and e is an integer of 1–5, or

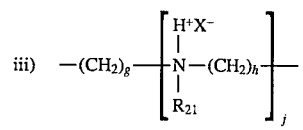

wherein $R_{21}$ is —(CH$_2$)$_m$CH$_3$,

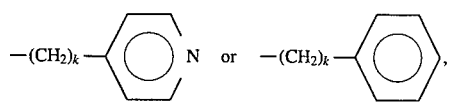

and g is :1–10, h is 1–10, j is 1–20, k is 1–5, m is 0–10 and X$^-$ is a chlorine, bromine or iodine ion;
b) two or three of $R_{14}$, $R_{15}$ and $R_{16}$ are —(CH$_2$)$_m$CH$_3$,

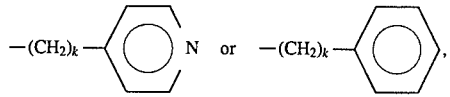

and other of $R_{14}$, $R_{15}$ and $R_{16}$ are H; and
2) other of $R_9$, $R_0$, and $R_{11}$ are $R_{12}$, or unsubstituted or halo-substituted alkyl groups having from 1 to 5 carbon atoms.

A fourth embodiment of the present invention comprises a composite material having the formula:

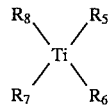  (III)

wherein one or both of $R_7$ and $R_8$ is SUPPORT—O— and the other of $R_5$, $R_6$, $R_7$ and $R_8$ are the same or different and are monoamines or polyamines, wherein a nitrogen is bonded to said Ti atom.

The invention also includes a method of removing heavy metal ions from a liquid stream, such as an aqueous waste stream, comprising the step of contacting the stream with a composite material of the present invention under conditions effective to complex heavy metal ions onto the composite material.

DETAILED DESCRIPTION OF THE INVENTION

Figure 1:
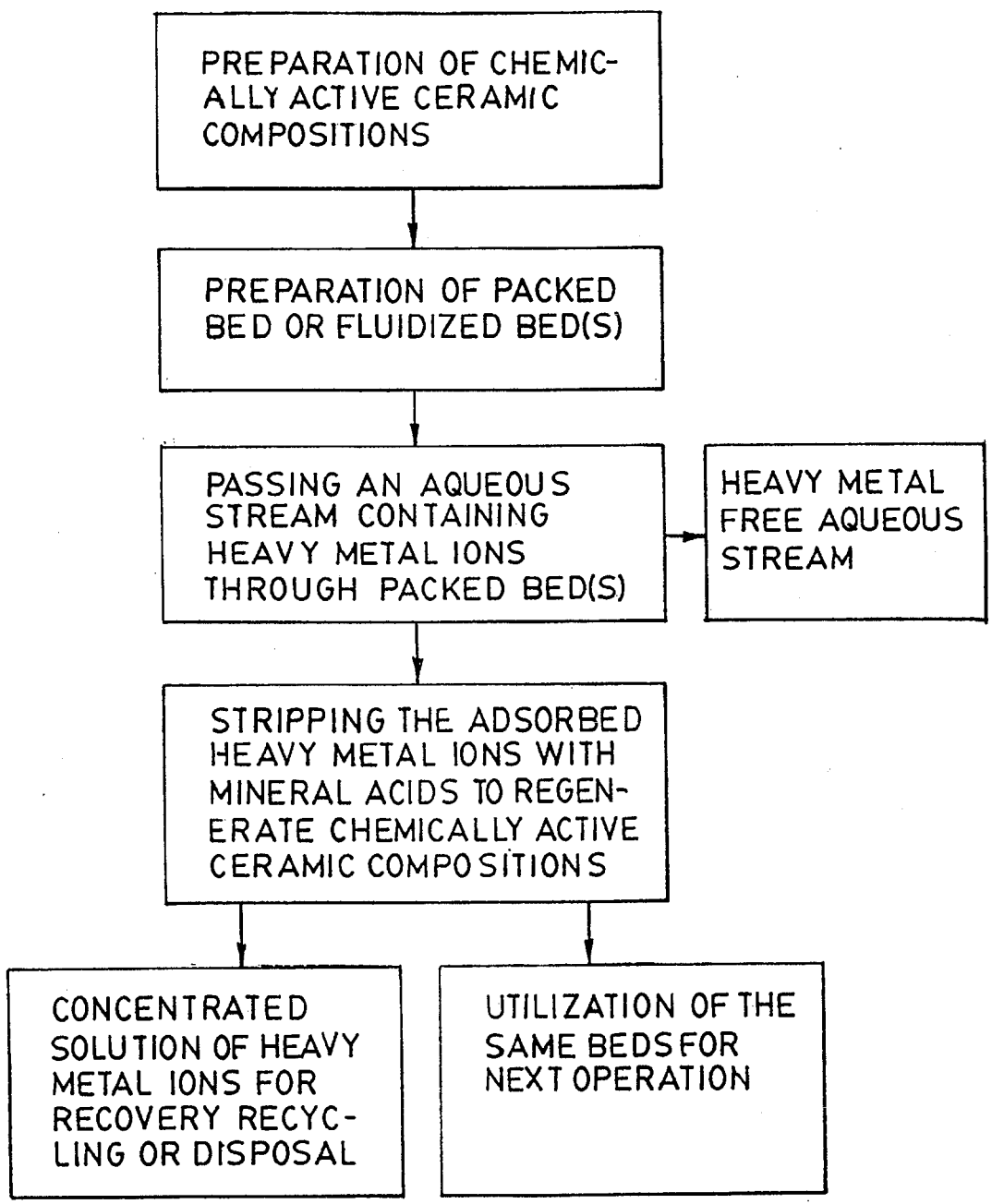
FIG. 1 is a flow chart of the process for separation and recovery of heavy metal ions with chemically active ceramic compositions.

The present invention relates to novel compositions that have very high capacities for chelating heavy and/or rare earth metals and can be readily designed to selectively remove individual metals. Furthermore, the present invention relates to methods of making those compositions and of using them for removing metal ions from solutions and, especially, from aqueous waste streams.

The ceramic inorganic carriers useful to prepare the compositions of the present invention are those ceramic materials having terminal hydroxy groups. For example, alumina, titanium oxide, zirconium oxide, and silica-alumina are all useful in the compositions of the present invention. Silica gels are preferred due to the high density of hydroxy groups per unit surface area, higher overall surface area, and varying particle size. The silica gels preferred for use in the present compositions are in the form of particles (e.g., beads) having a diameter generally in the range of 3 mesh (about 0.635 cm) to 270 mesh (about 53 μm), Tyler Sieve scale. Most preferably, the silica gel beads used in accordance with the present invention have a diameter in the range of 14 to 270 mesh, have surface area of about 350 to 600 m²/gm and pore sizes (diameters) of about 40 to 150 angstroms. For the purposes of the present invention, the inorganic carrier portion of the inventive composite materials shall hereafter be designated "SUPPORT". According to the present invention, chemical compounds used as linking groups (i.e., groups which attach the chelating agent to the support) provide a linking chain between the chelating agent and the support to effect covalent bonding. This linkage is achieved by covalently bonding one end of the linking group to the support and another end of the linking group to the chelating agent. In the former case, the covalent bond is formed after removal of the hydrogen from the hydroxyl groups of the support. The covalent bonding site on the support is designated herein as "SUPPORT—O—". In one embodiment of the present invention, the composite material useful for removing heavy metals from waste streams has formula (I) below:

$$\begin{array}{c} R_3 \\ | \\ R_2-Si-R_4 \\ | \\ R_1 \end{array} \quad (I)$$

wherein at least one of $R_1$-$R_3$ are SUPPORT—O— and the other of $R_1$-$R_3$ are the same or different and are unsubstituted or halosubstituted alkyl groups having 1–5 carbon atoms and $R_4$ is $$-(CH_2)_{\overline{a}}-S-(CH_2)_b-_{\overline{c}}SH,$$

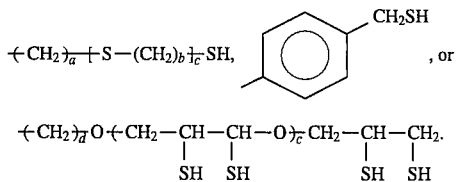

or $$-(CH_2)_{\overline{a}}O-(CH_2-CH-CH-O)_{\overline{c}}CH_2-CH-CH_2.$$
$$\qquad\qquad\quad | \quad\ | \qquad\qquad\qquad | \quad\ |$$
$$\qquad\qquad\,\, SH\ \ SH \qquad\qquad\quad SH\ SH$$

a is an integer of 1–20, b is an integer of 2–8, c is an integer of 0–5 and d is an integer of 1–5. Particularly preferred thiol-containing composites are obtained when $R_1$-$R_3$ are each SUPPORT—O— and $R_4$ is either $(CH_2)_3$—SH or $(CH_2)_3$—O—$CH_2CHSHCH_2SH$.

In accordance with the present invention, the thiol-containing composite described by formula (I) above is produced by covalent attachment of the thiol group of a thiol-containing silane coupling agent on the surface of an inorganic carrier. Covalent attachment can be accomplished, for example, by refluxing a solution of the thiol-containing silane with the inorganic carrier under heat for about 16–20 hours. A preferred synthesis includes first suspending about 20.0 g of 70–270 mesh silica gel in a thiol-containing-silane in solvent (e.g., toluene) solution having a concentration of about 50 volume percent ("v/v%"). The silane mixture is refluxed at about 75° C. for a time sufficient to effect covalent bonding of the thiol (e.g., about 15–20 hours). Example 1 below further illustrates an exemplary synthesis of inventive compositions according to Formula I.

Exemplary thiol-containing silanes include mercaptoalkylsilanes (e.g., (3-mercaptopropyl)triethoxy silane, and (3-mercaptopropyl)trimethoxy silane). Various solvents such as benzene, toluene, xylene, hexane, or cyclohexane can be used to prepare a solution of the mercaptoalkylsilane. A preferred mercaptoalkylsilane solution is 10 to 50 volume percent (3-mercaptopropyl)triethoxy silane in toluene.

The thiol-containing composite materials of the present invention can be used to remove a variety of heavy metals from waste streams including, for example, cadmium, lead and zinc. The thiol-containing composites are particularly selective for cadmium and are able to remove cadmium from waste streams. With regard to lead, the thiol-containing composites will remove lead most effectively at pHs greater than 5.0, preferably greater than 6.5. In addition, the thiol-containing composites can remove copper selectively from waste streams containing, for example, copper and nickel. Consequently, the thiol composites of the present invention are particularly effective in treating waste streams containing low concentrations of cadmium (i.e., anywhere from 1.0 to 200 parts per million ("ppm"))as well as waste streams containing higher concentrations. If the waste stream is to be buffered to attain and/or maintain optimum operating pHs, any conventional buffering system (e.g., acetic acid/ammonium hydroxide, potassium hydrogen phthalate/sodium hydroxide, tris(hydroxymethyl)aminomethane/hydrochloric acid) can be utilized. Likewise, pH adjusting agents (e.g., ammonium hydroxide, hydrochloric acid) can be used to adjust the fluid stream pH.

In another embodiment, a chelating composition is prepared by covalent attachment of both a thio and an amino group on the surface of a inorganic carrier. Chemically active ceramic compounds having both a thio and amino group on the surface of an inorganic carrier have the following formulae:

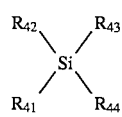

and

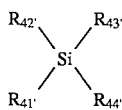

wherein at least one of $R_{41}$-$R_{43}$ and one of $R_{41'}$-$R_{43'}$ are SUPPORT—O—

$R_{44}$ is —$(CH_2)_a$–[$S$—$(CH_2)_b$–]$_c$SH, wherein a is an integer from 1–20, b is an integer from 2–8 and c is an integer from 0–5.

$R_{44'}$ is an amine; and other of $R_{41}$-$R_{43}$ and $R_{41'}$-$R_{43'}$ are the same or different and are unsubstituted or halo-substituted alkyl groups having 1–5 carbon atoms, $R_{44}$ or $R_{44'}$, respectively.

For example, a mixture of one mercaptoalkylsilane (e.g., 3-mercaptopropyl-triethoxy silane, 3-mercaptopropyltrimethoxy silane, etc.) and one aminoalkyl silane (e.g., 3-aminopropyl-triethoxy silane, 3-aminopropyltrimethoxy silane, etc.) can be prepared in equimolar concentration in suitable solvents (e.g., benzene, toluene, xylene, hexane, cyclohexane) to have equal surface coverage of both thio and amino groups on the surface of the support or in different ratios to vary the surface coverage of the thiol and amino groups on the support. The relative ratio of the thiol and amino groups on the inorganic carrier can be used to control the selectivity of the individual composition.

It has been discovered that amine-containing compounds as disclosed in the present invention are particularly selective for copper ions in waste streams. Accordingly, the thiol/amine composite materials can be prepared in such a way to maximize removal of heavy metals according to the concentration of heavy metals contained in a given waste stream. Although ligands containing either nitrogen or sulfur can form strong complexes with heavy metal ions, they do not seem to have good selectivity. For example, if a waste stream contained relatively large amounts of copper and small amounts of cadmium, a composite material containing a relatively large amount of amine and relatively smaller amounts of thiol could be prepared by modifying the molar quantities of the precursor materials used in preparing the composites. The optimum operating pH for the thiol/amine composites will depend on the relative ratios of amine and thiol on the material. Generally, the thiol/amine composites should be used in liquid streams having a pH in the range of about 2 to 10.

One advantage of the thiol and thiol/amine composites of the present invention is that, once saturated, the composite material can be quickly, easily and inexpensively regenerated (i.e., stripped of accumulated heavy metal ions). Simple regeneration of the materials provides three important advantages: (1) it facilitates reuse of the composite material, (2) avoids creation of voluminous amounts of heavy metal laden sludge that must be buried or otherwise stored, and (3) allows recapture of the excess heavy metal for recycling back into the original manufacturing process. Regeneration of the thiol composites can be accomplished by treating the materials with dilute mineral acids (e.g., hydrochloric acid, nitric acid, sulfuric acid, perchloric acid, acetic acid, formic acid). A preferred method of regenerating the thio composite materials is by contacting the material with approximately 0.05M hydrochloric acid.

In another embodiment of the present invention, composite materials useful for removing heavy metals from waste streams are produced using amine salts as chelating agents. Amine salt-containing composites according to the present invention have formula (II) below:

wherein 1) at least one of $R_9$, $R_{10}$ or $R_{11}$ is SUPPORT—O— and $R_{12}$ is

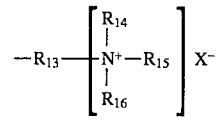

wherein:

a) $R_{13}$ is
  i) an unsubstituted or lower aryl or lower alkyl substituted saturated hydrocarbon chain having 1–20 carbon atoms,

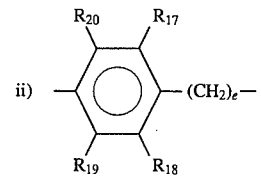

wherein $R_{17}$-$R_{20}$ are the same or different and are —H or —$(CH_2)_f CH_3$, where f is an integer from 0–20 and e is an integer from 1–5, or

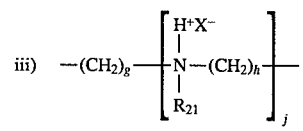

wherein $R_{21}$ is —$(CH_2)_m CH_3$,

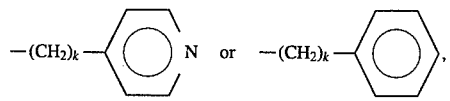

and g is 1–10, h is 1–10, j is 1–20, k is 1–5, m is 0–10 and $X^-$ is a chlorine, bromine or iodine ion;

b) two or three of $R_{14}$, $R_{15}$ and $R_{16}$ are —$(CH_2)_m CH_3$,

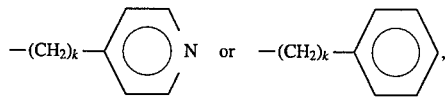

and other of $R_{14}$, $R_{15}$ and $R_{16}$ are H; and 2) other of $R_9$, $R_{10}$ and $R_{11}$ are $R_{12}$ or unsubstituted or halo-substituted alkyl groups having from 1 to 5 carbon atoms.

Preferred amine-salt containing composites generically described by the above formulae include propyl-tributylammonium chloride, propyl-trimethylammonium chloride, propyl-triethylammonium chloride, propyl-dibutylammonium hydrogen chloride attached to a silica gel support.

The amine salt composites of the present invention are produced by covalent attachment of a quaternary ammonium or tertiary ammonium functional group via several routes. One such route, for example, requires reacting inorganic carrier with a quaternary ammonium organofunctional silane (e.g., (triethoxy) silylpropyl trimethylammonium chloride, (trimethoxy) silylpropyl trimethylammonium chloride). Another route of covalently attaching the quaternary or tertiary ammonium compound is by reacting inorganic carrier with a silane (e.g., 3-chloropropyl-trimethoxy silane, 3-chloropropyl-triethoxy silane). Next, the modified inorganic carrier is reacted with a di- or tri- alkylamine (e.g., triethylamine, tripropylamine, tributylamine, dibutylamine, dipropylamine, chloromethyl pyridine) to produce a tertiary or quaternary ammonium functional group on the modified inorganic carrier of different carbon chain length, size and hydrophobicity depending on the selection of the appropriate reagents. For example, a tertiary or quaternary ammonium functional group can be prepared by varying the carbon chain length attached to the nitrogen atom in the respective functional group by reacting, for example, a chloro-alkyl modified inorganic carrier with trialkyl or dialkylamine. That type of amine salt, with larger carbon chain length, will have a larger cation which has the tendency to form ion pairs with larger anionic heavy metal ions or anionic complexes of heavy metal ions (e.g., $HCrO_4^-$, $HMoO_4^-$, $SbCl_6^-$). On the other hand, amine salts with smaller carbon chain lengths will have a tendency to form ion pairs with other smaller size anionic complexes of heavy metal ions (e.g., $CdCl_3^-$, $CdCl_4^{-2}$, $Zn(CN)_4^{-2}$, $Cu(CN)_2^-$). The specificity of tertiary or quaternary ammonium functional groups is dependent on the charge to size ratio of heavy metal ions. Also, tertiary or quaternary ammonium functional composites can be prepared by varying the number of nitrogen atoms within a given carbon chain length (for example, triethylene tetramine, diethylene triamine) to facilitate multiple charges on one chain. These types of amine salts are-specific for removal of highly charged ions (e.g., $Cr_2O_7^{-2}$, $TcO_4^{-1}$, $PbCl_4^{-2}$, $Fe(CN)_6^{-4}$, $Fe(CN)_6^{-3}$).

The amine salt composites of the present invention can be used at a variety of pHs but have an optimum operating pH in the range of about 2 to 8. The amine salt composites can be used to selectively remove heavy metal ions such as lead, zinc, cadmium, copper, palladium, platinum, chromium(VI), molybdenum(VI), antimony(V).

Alternatively, composites according to the present invention can be produced by first coating an inorganic carrier with a titanium-containing compound (e.g., titanium(IV) chloride, titanium(IV) ethoxide, or titanium(IV) propoxide). In a preferred embodiment, inorganic carrier is titanized by reacting it with an approximately 20 volume percent solution of titanium(IV) chloride in, for example, dry hexane. The reaction is carried out under mild heating for 4 to 6 hours.

It has been unexpectedly discovered that the titanized inorganic carrier can then be used directly (i.e., without a group linking the chelating agent to the substrate) as a substrate for an amine or amine salt as a chelating agent. If an amine is to be attached to the titanized substrate, the titanized inorganic carrier is then further reacted with an amine by stirring the mixture in a vessel with a refluxing condenser to chemically immobilize the amine. Immobilization of the amine is, essentially, affixing the chelation molecule to the titanized silica surface either by physical or chemical linkage. Chemical linkage can involve covalent attachment through carbon-carbon, carbon-nitrogen, or carbon-sulfur bonds, for example, to the titanized surface of the substrate. Physical linkage involves intermolecular forces such as van der Waals', or dipole-dipole interactions. Exemplary amines include 1,4-diaminobutane, ethylene diamine, n-ethylethylene diamine or n-butylamine. Most preferably, n-butylamine can be used to produce butylamine immobilized titanized inorganic carrier. Exemplary amine salts include the amine salts described above.

If an amine salt is to be attached to the titanized substrate, a covalent attachment mechanism such as the one described above relative to non-titanized substrates can be used.

Composite materials prepared on titanized substrates and including an amine as a chelating agent according to the present invention have formula (III):

wherein one or both of $R_7$ and $R_8$ is SUPPORT—O— and other of $R_5$, $R_6$, $R_7$ and $R_8$ are the same or different and are selected from the group consisting of monoamines or polyamines, wherein a nitrogen is bonded to said Ti atom. Preferably, the R groups that do not constitute the support and oxygen linkage each are polyamines having the formula —NH—[$(CH_2)_{aa}$—NH]$_{bb}$—$(CH_2)_{aa}$—$NH_2$, wherein aa is an integer from 1–10 and bb is an integer from 0–20. Most preferably, two of $R_5$, $R_6$, $R_7$ and $R_8$ constitute the support and oxygen linkage and the remaining R groups are each a polyamine having the formula —NH—[$(CH_2)_{aa}$—NH]$_{bb}$—$(CH_2)_{aa}$—$NH_2$. In particularly preferred embodiments, the polyamines attached to the remaining R groups are the same.

Monoamines and polyamines useful in preparing composite materials according to the present invention include butylamine, pentylamine, hexylamine, butylene diamine, triethylene tetraamine and pentaethylene hexaamine.

Composites prepared using titanized substrates and amine salts as chelating agents according to the present invention have formula (IV):

wherein:

1) one or both of $R_{24}$ and $R_{25}$ is SUPPORT—O— and other of $R_{22}$, $R_{23}$, $R_{24}$ and $R_{25}$ are the same or different and are

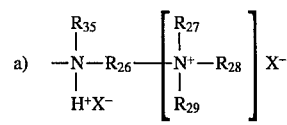

wherein i) $R_{26}$ is
  a) an unsubstituted or lower aryl or lower alkyl substituted saturated hydrocarbon chain having 1–20 carbon atoms, or

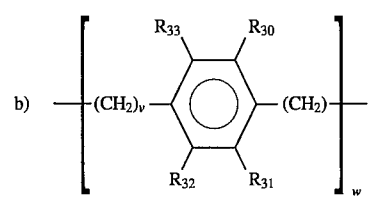

wherein v is 0–5 and w is 1–5 and $R_{30}$-$R_{33}$ are the same or different and are —H or —$(CH_2)_dCH_3$ wherein d is 0–20, or c) 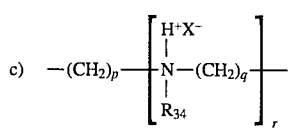

wherein $R_{34}$ is

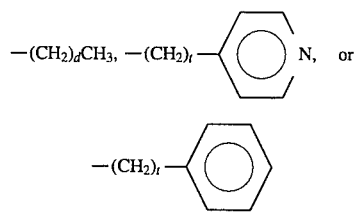

wherein p and q are the same or different and are 1–10, r is 1–20, t is 1–5 and $X^-$ is a chlorine, iodine or bromine ion; and ii) $R_{35}$ and two of $R_{27}$, $R_{28}$ and $R_{29}$ are

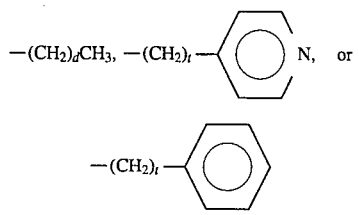

and other of $R_{27}$, $R_{28}$ and $R_{29}$ are H; or b) 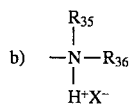

wherein $R_{35}$ is as defined above and $R_{36}$ is i) an unsubstituted or lower alkyl or lower aryl substituted, saturated hydrocarbon chain having 1–20 carbon atoms; or ii) 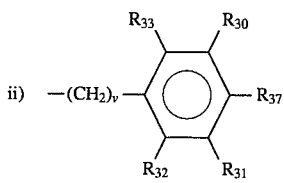

wherein $R_{30}$-$R_{33}$ and $R_{37}$ are the same or different and are —H or —$(CH_2)_uCH_3$ wherein u is 0–20.

Preferred compositions of the compound described by Formula (IV) are:

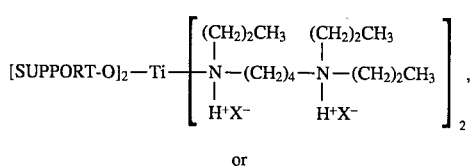

or

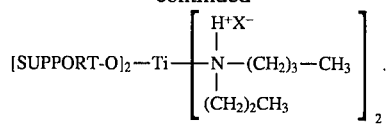

The compositions of the present invention have the capability of removing, in a selective manner, heavy metal ions in dilute solutions from aqueous streams. The compositions of the present invention in general can be used for removal from aqueous streams heavy metals such as antimony, arsenic, beryllium, cadmium, chromium, copper, lead, mercury, nickel, selenium, silver, thallium, tin, zinc, molybdenum, palladium, platinum, silver, gold, cobalt, technetium, rhenium and rare earth metals such as cerium, neodymium, and praseodymium.

Typically, the compositions of the present invention are placed in packed beds or fluidized beds and the waste stream is passed through the bed. The compositions act to chelate with the unwanted metal ions, even if the ions are present in only dilute concentrations. Examples of useful beds for the chelating compositions described herein are found in U.S. Pat. Nos. 4,824,576 to Sood et al. and 4,448,694 to Plueddemann, the disclosures of which are hereby incorporated by reference.

Figure 2:
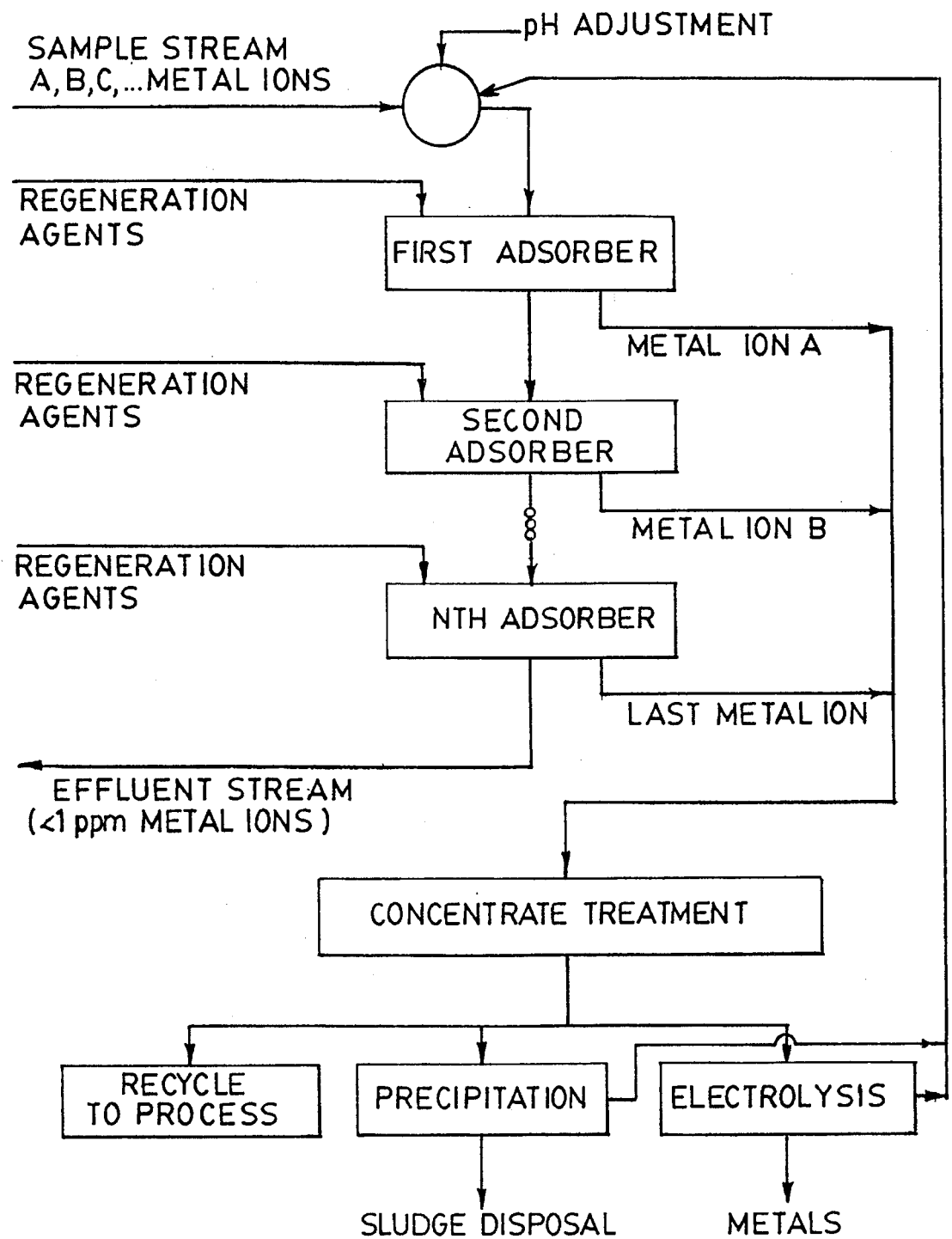
FIG. 2 is a flow chart illustrating the process of the invention by using different inventive compositions in a series of multiple adsorbent beds for metal ion separation and/or metal recovery.

The compositions of the present invention can be used for removal and recovery of heavy metal ions by a variety of methodologies as outlined by FIGS. 1 and 2. FIG. 1 is a process outline for separation and recovery of metal ions with chemically active inorganic carriers. FIG. 2 is a flow sheet illustrating the process of the invention by using a series of multiple adsorbent beds for metal ion separation and/or metal recovery.

The process of metal ion removal of the present invention contemplates several modes of operation. Many factors are considered in choosing the appropriate methodology, including the composition of the aqueous stream to be treated, the industrial process through which the contaminated aqueous stream is generated, the desired purification level of the aqueous stream, the degree of separation of metal ions from the waste stream desired, and the end use of the effluent from the bed.

In one embodiment of the present process, an operation mode can be employed to remove all metal ions simultaneously from an aqueous stream containing multiple metal ions by passing the stream through a single adsorbent packed bed or fluidized bed containing a composition according to the present invention. The column breakthrough volume (i.e., volume at which a minimum threshold concentration of metal ions in the effluent is exceeded) can be determined by monitoring the metal ion concentration in the effluent with an atomic absorption spectrophotometer, flow injection analysis, ion selective electrodes, or other known methods of metal ion concentration analysis and/or monitoring pH of the effluent.

The loaded column (extent of column saturation when breakthrough volume occurred) can be regenerated by desorbing the adsorbed metal ions from the column. The adsorbed metal ions can be recovered simultaneously by, for example, stripping all metals from a bed of chemically active silica gel with mineral acid (e.g., nitric acid, hydrochloric acid), as discussed supra. Upon regeneration, the chemically active inorganic carrier bed can be used for the next operation. The metal ion concentrate obtained during regeneration can be used to recover metals present by any one of two techniques or the metals can be disposed of as a sludge as illustrated in FIG. 2. In the first recovery method, the metals are recovered by electrolysis. The second method involves recycling the metal concentrate back to the process which first generated the polluted aqueous stream. In the third method, the metals can be precipitated to form sludge which can subsequently be disposed of in an environmentally safe manner.

In accordance with the present invention, it has been unexpectedly discovered that the efficiency of the removal process relative to certain metal ions is dependent on the pH of the waste stream. Therefore, as shown in FIG. 2, the pH of the waste stream can be advantageously adjusted if necessary (depending on the composite material used). This process operation is typically performed by buffering an aqueous stream entering the bed of chemically active ceramic composition. Alternatively, instead of employing a buffer solution, it is possible to use a dilute ammonium hydroxide solution to simply adjust the pH of an acidic aqueous stream entering the packed or fluidized bed of chemically active inorganic carrier. In that case, because the inventive materials are acidic in nature and release protons when they absorb metal ions, the pH of the effluent stream decreases as additional bed volumes pass through the bed. The pH of effluent stream decreases and reaches a minimum value whereby it becomes acidic. The inventive materials have a preferred pH band at which the adsorption efficiency for each metal ion is maximized. A pH below that pH is defined as acidic for the purposes of the present invention. At that pH, the adsorption of metal ions on the composite bed has been found to decrease. That point is termed the "breakthrough point" and can be determined by monitoring the pH of the effluent stream or by monitoring the metal ion concentration in the effluent aqueous stream.

At the breakthrough point, the flow of aqueous stream through the bed can be stopped, and the bed can be made operational again by passing one or more bed volumes (i.e., an amount of fluid equal to the volumetric fluid capacity of the bed) of buffer solution through the bed. Buffering the column reestablishes the initial pH and extends the adsorptive life of the column and allows its use for the adsorption of metal ions until the column approaches its adsorption capacity (i.e., the point at which substantially all of the available sites for chelation of heavy metal ions are occupied) as determined by the breakthrough volume.

Adjusting the fluid stream pH with ammonium hydroxide (rather than using a buffer at the start) is highly advantageous because it decreases the cost of operation and minimizes the contamination of the effluent aqueous streams with buffer solutions, enabling environmentally safe disposition of the effluent. It is also possible to determine the breakthrough point by simply monitoring the pH of the effluent stream.

In another embodiment of the present process, all the metal ions in a waste stream containing more than one type of species of metal ion can be simultaneously removed by passing the waste stream through the single bed of chemically active inorganic carriers.

The selectivity of the inventive materials is highly advantageous. For example, a single metal ion from the aqueous stream containing multiple metal ions can be removed by passing the stream through a single packed or fluidized bed of the inventive composite materials where removal, recycling or disposal of only one metal ion is desired. The adsorbed metal ion can be desorbed from the bed of chemically active inorganic carrier with mineral acid. For example, a composite material as described above can be used to remove cadmium from the aqueous stream buffered to a pH 6.5 and containing lead, calcium and magnesium.

The adsorbed cadmium can be recovered by stripping with dilute mineral acids, and the regenerated bed can be utilized for the next operation. The metal ion concentrate can be used to recover, recycle or dispose of lead using techniques such as electrolysis, recycling and precipitation, as discussed above.

The selectivity exhibited by certain of the compositions of the present invention is also highly advantageous due to the high concentration of metal ions such as calcium and magnesium present in typical waste streams that do not need to be removed. In conventional heavy metal-removing beds, nonselective materials remove calcium or magnesium ions (as well as the heavy metal contaminants) and become quickly saturated due to the high concentration of magnesium and calcium in most aqueous waste streams. The bed must then be frequently regenerated (if possible) or replaced. On the other hand, the inventive composite materials selectively remove only the target heavy metal ions (e.g., lead, cadmium). Therefore, the composite material does not become as quickly saturated and can be used for longer periods without regeneration or replacement. As noted more specifically in the Examples (infra) certain of the inventive materials (e.g., the thiol-containing composites) are capable of removing heavy metal ions for up to 250 (or more) bed volumes and have extraordinarily high adsorption capacities for cadmium.

In another embodiment of the process of the present invention, metal ions can be separately and specifically removed by adsorbing those metal ions on a series of metal ion selective beds. As illustrated in FIG. 2, the metal ions can be removed in a sequential manner from the aqueous stream containing a mixture of multiple metal ions by passing the stream through the multiple beds where each bed contains an inventive composite that selectively removes one of the metal ions. The breakthrough point of the beds can be determined by monitoring the metal ion concentration in the effluent stream from the column by the methods discussed supra. These multiple beds can then be regenerated as described above and the metal ions removed from the bed can be recycled or disposed of.

For example, copper can be removed from a waste stream containing copper, lead, and/or cadmium by passing the stream first through a bed of amine-containing composites. The waste stream can then be conducted into a second bed containing thiol-containing composites to remove lead and/or cadmium. In that way the heavy metal ions are separated from the waste stream and from each other and can be easily recaptured and recycled in to the original manufacturing process. Accordingly, the processes and materials of the present invention can completely remove and separate two distinct metal ions and facilitate maximum utilization of the beds' relative capacities, thereby providing valuable increased efficiency in the metal ion removal process.

The present invention is further described by the following non-limiting examples.

Example 1:

A 50 vol. % solution of (3-mercaptopropyl)-trimethoxy silane in toluene was prepared. That solution was refluxed with silica gel beads having a size of 70–270 mesh (surface area of about 500 m$^2$/g and pore size 60 angstroms) at 70°–80° C. for 16 to 20 hours. The reacted silica gel was washed repeatedly with toluene and acetone and dried at 50°–60° C. The material prepared according to this example is designated as Sample A.

Example 2:

A solution containing both 7-aminopropyltrimethoxy silane (29.8 vol. %) and 3-mercaptopropyltrimethoxy silane (27.7 vol. %) in toluene was prepared. That solution was reacted with silica gel beads having a size of 70–270 mesh (surface area of about 500 m$^2$/g and pore size 60 angstroms) by refluxing at 70°–80° C. for 10 to 12 hours. The reacted silica beads were filtered, washed with toluene, methanol and acetone and dried at 60°–70° C. The composite beads produced according to this example are designated as Sample B.

Example 3:

The surface of silica gel beads having a size of 70–270 mesh (surface area of about 500 m$^2$/g and pore size 60 angstroms) was titanized by reacting silica gel with a 20 vol. % solution of titanium(IV) chloride in dry hexane. The reaction was carried out at 70°–75° C. for 4 to 6 hours. The titanized silica gel was then reacted with n-butylamine by placing the titanized silica gel beads in a 10 vol. % solution of n-butylamine in hexane at 65°–70° C. for 4 to 6 hours. The material prepared according to this example is designated as Sample C.

The extraction efficiency of Sample C composites for copper and nickel was determined by equilibrating 25 ml of 200 ppm solution of copper and nickel at various pH with 1.0 g of Sample C. It was discovered that Sample C could adsorb copper quantitatively (more than 99.9%) at pH 9.0 while no adsorption of nickel was observed. Also, adsorbed copper can be recovered by desorbing adsorbed copper with 0.1M sulfuric acid.

Example 4:

A 25 vol. % solution of (triethoxy) silylpropyltrimethyl ammonium chloride (silylating agent) in toluene is prepared. Next, silica gel beads having a size of 70–270 mesh (surface area of about 500 m$^2$/g and pore size 60 angstroms) were refluxed with the silylating agent solution in a 16.6 vol. % mixture of toluene in ethanol. The reflux reaction was allowed to proceed at 70° C. for 12 hours. The refluxed silica gel beads were washed successively with toluene, ethanol, water and acetone, and dried at 40° C. The material prepared according to this example is designated as Sample D.

Example 5:

Sample A beads were packed in a one centimeter ("cm") diameter column to a height of 10 cm. Aqueous solution containing cadmium ions at a concentration of 200 parts per million ("ppm") were flowed throughout the packed column at a flow rate of 1 milliliter per minute to provide approximately 10 minutes of residence or contact time between the solution and the chemically active silica gels. The aqueous solution was buffered at pH 6.5 using acetate buffer.

The capacity of the chemically active silica gel beads for a given metal ion was determined by performing breakthrough studies on the packed bed. Accordingly, an aqueous solution containing metal ions was passed through the column at a flow rate of 1 ml/minute and the metal ion concentration in the effluent from the column was determined with an atomic absorption spectrophotometer. Thus, capacity of the ceramic compositions was calculated from the total amount of metal ion absorbed on the bed at saturation of the bed.

The capacity of the packed column was determined according to the procedures described above. The concentration of the effluent was measured periodically to determine the number of bed volumes that could be treated by the packed column before the beads were saturated and no longer removed the metal ion from the stream. The initial capacity was calculated at the end of the first period of saturation of the bed. Saturation is defined as a state after which no more metal ions are adsorbed on the bed. Thus, after saturation of the bed the concentration of metal ion in the solution entering the bed (feed solution) is, generally, equal to the concentration of metal ions in the solution coming out of the bed (effluent solution). The packed bed saturated with metal ions was then regenerated by stripping the metal ions from the packed bed using 4 bed volumes of 0.05 molar hydrochloric acid at predetermined concentrations. The combined sequence of saturation of the bed with the metal ions from the feed solution and regeneration of the bed by stripping the adsorbed metal ion from the synthesized adsorbents in the bed is denoted as one cycle of operation.

The fresh capacity of the Sample A beads (i.e., the capacity after one cycle of operation) for cadmium was 80.36 mg/g. After 20 cycles, the capacity of the Sample A beads for cadmium was still an excellent 54.28 mg/g.

Figure 3:
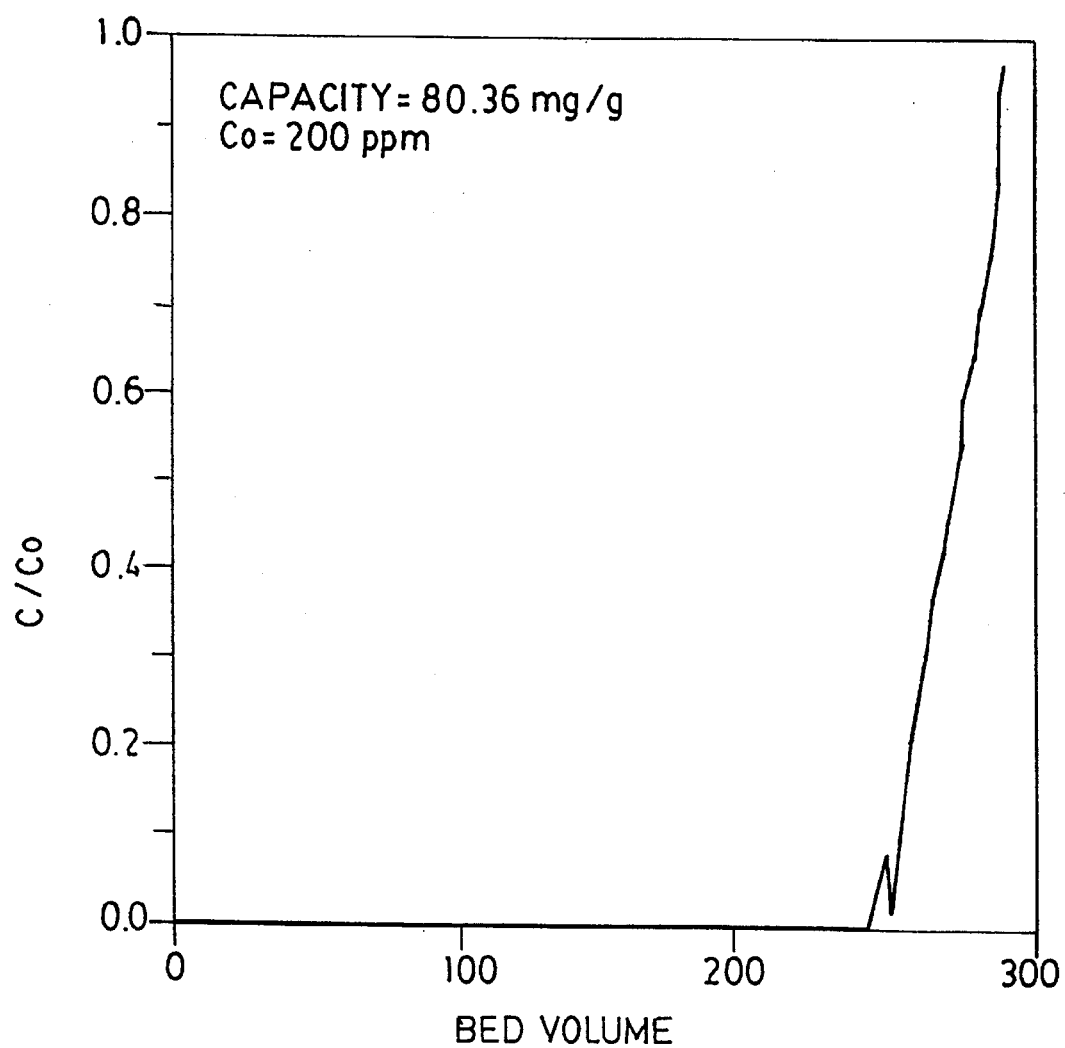
FIG. 3 illustrates the relationship between the ratio of cadmium ion concentration in an effluent stream to the cadmium ion concentration in a feed stream versus the bed volumes passed through a column of a composition prepared according to the present invention.

FIG. 3 illustrates the relationship between the ratio of metal ion concentration in the effluent stream to the metal ion concentration in the feed stream versus the bed volumes passed through the column. As shown by FIG. 3, the packed column containing material of the present invention was able to reduce the concentration of cadmium to less than 1 ppm up to approximately 250 bed volumes. The large number of bed volumes successfully treated by the packed column of Sample A beads illustrates the excellent capacity of the materials of the present invention. The large number of cycles after which a high capacity still remains illustrates the excellent durability of the materials of the present invention.

Figure 4:
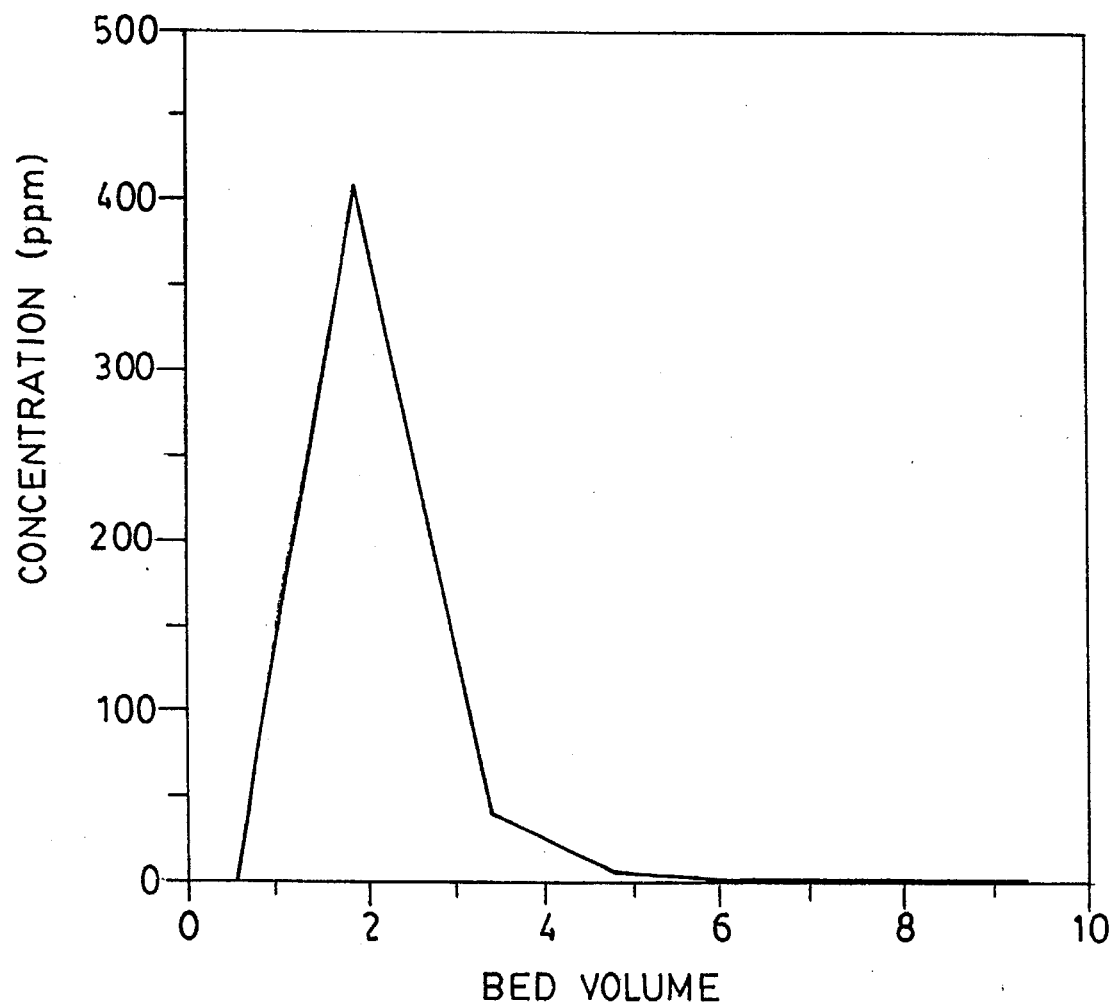
FIG. 4 illustrates the relationship between the cadmium ion concentration in an effluent stream versus the bed volumes of a strip solution passed through a column of a composition prepared according to the present invention which is initially loaded with a known amount of cadmium.

As shown in FIG. 4, the packed column was fully regenerated by washing the column with about 4 bed volumes of 0.05M hydrochloric acid. Upon regeneration, 98.7 weight percent of the original cadmium that was removed from the waste stream which passed through the bed was recovered from the saturated beads.

Figure 5:
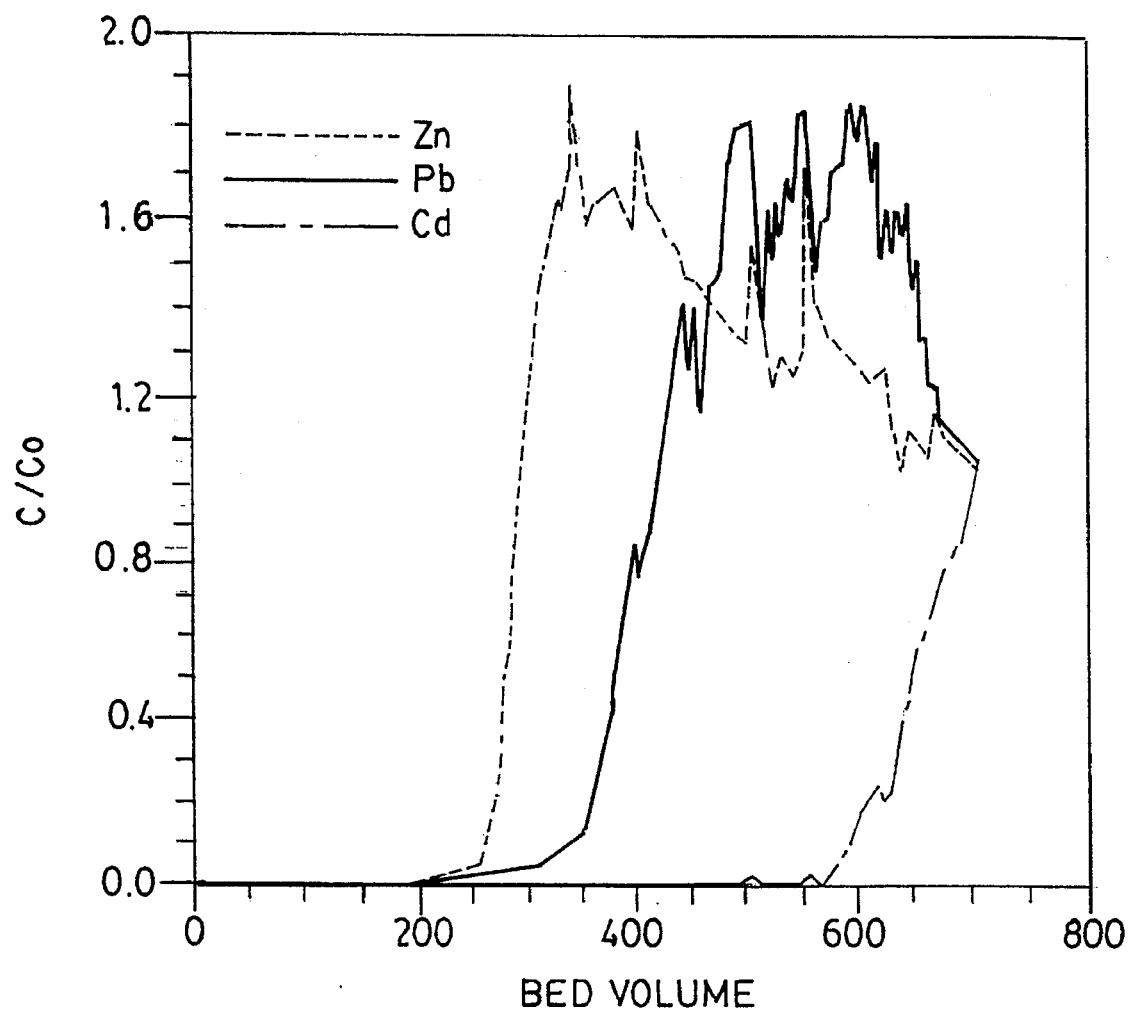
FIG. 5 illustrates the ratio of the respective zinc, cadmium and lead ion concentrations in an effluent stream to the respective zinc, ocadmium and lead ion concentrations in a feed stream versus the bed volumes passed through a column of composite materials prepared according to the present invention.

Example 6:

Example 5 was repeated except that the fluid stream contained 54.5 ppm zinc, 50.5 ppm lead, and 50.5 ppm cadmium. FIG. 5 shows the relationship of the ratio of the respective zinc, cadmium and lead ion concentrations in an effluent stream to the respective zinc, cadmium and lead ion concentrations in a feed stream versus the bed volumes passed through the column of Sample A beads. As shown by FIG. 5, the packed column of Example 6 was able to reduce the concentration of cadmium, zinc and lead for up to 250 bed volumes to less than 1 ppm. Also FIG. 5 illustrates that cadmium would be removed from the bed for an additional 330 bed volumes. However, the additional removal of cadmium results in the desorption of zinc and lead from the bed. Therefore, this example indicates that Sample A beads are more selective toward cadmium than to zinc or lead. That characteristic of the Sample A material is advantageous if it is desired to remove preferentially cadmium from a solution containing for example, cadmium, zinc and lead.

Although the present invention has been described in detail for the purpose of illustration, it is understood that such detail is solely for that purpose, and variations can be made therein by those skilled in the art without departing from the spirit and scope of the invention as described by the following claims.

What is claimed is:

1. A composite material suitable for removing heavy metal ions from waste streams, having the formula

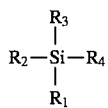 (I)

wherein at least one of $R_1$-$R_3$ is SUPPORT—O— and other of $R_1$-$R_3$ are the same or different and are unsubstituted or halosubstituted alkyl groups having 1–5 carbon atoms and $R_4$ is

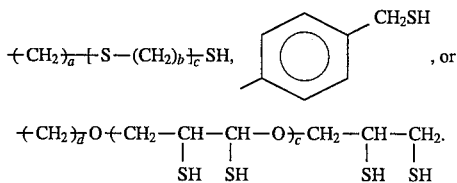

wherein
a is an integer from 1–20, b is an integer from 2–8, c is an integer from 0–5, and d is an integer from 1–5.

2. A composite material according to claim 1, wherein only one of $R_1$, $R_2$, $R_3$, is SUPPORT—O—.

3. A composite material according to claim 2, wherein $R_4$ is —$(CH_2)_a$—SH or —$(CH_2)_d$—O—$CH_2$—CHSH—$CH_2$SH.

4. A composite material according to claim 1, wherein $R_1$, $R_2$ and $R_3$ are SUPPORT—O— and $R_4$ is —$(CH_2)_3$—SH.

5. A method of making a composite material suitable for removing heavy metal ions from fluid waste streams comprising the steps of
providing an inorganic substrate having terminal hydroxyl groups;
providing a thiol-containing silane compound; and
covalently attaching said thiol-containing silane compound to the oxygen of said terminal hydroxyl group.

6. A method according to claim 5, wherein said thiol-containing silane compound is selected from the group consisting of mercaptoalkylsilanes and mercaptoarylsilanes.

7. A method according to claim 6, wherein said thiol containing silane is 3-mercaptopropyl-trimethoxy silane.

8. A composite material suitable for removing heavy metal ions from waste streams,
which material contains the compounds of the following formulae:

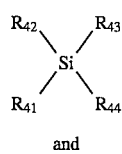

and

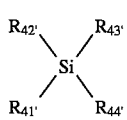

wherein
at least one of $R_{41}$-$R_{43}$ and one of $R_{41'}$-$R_{43'}$ are SUPPORT—O—;
$R_{44}$ is —$(CH_2)_a$—[S—$(CH_2)_b$—]$_c$SH, wherein a is an integer from 1–20, b is an integer from 2–8 and c is an integer from 0–5;
$R_{44'}$ is an amine; and other of $R_{41}$-$R_{43}$ and $R_{41'}$-$R_{43'}$ are the same or different and are unsubstituted or halosubstituted alkyl groups having 1–5 carbon atoms, $R_{44}$ or $R_{44'}$, respectively.

9. The composite material of claim 8, wherein said amine is selected from the group consisting of 1,4-diaminobutane, ethylene diamine, n-ethylethylene diamine, triethylene tetramine, n-butylamine, propyl amine, and tetraethylene pentamine.

10. The composite material according to claim 8, wherein said $R_{41}$, $R_{42}$ and $R_{43}$ are SUPPORT—O— and $R_{44}$ is —$(CH_2)_3$—SH, and $R_{41'}$, $R_{42'}$ and $R_{43'}$ are SUPPORT—O—, and $R_{44'}$ is —$(CH_2)_3$—$NH_2$.

11. A composite material suitable for removing heavy metals from waste streams said material having the formula:

 (III)

wherein
one or both of $R_7$ and $R_8$ is SUPPORT—O— and
other of $R_5$, $R_6$, $R_7$ and $R_8$ are the same or different and are selected from the group consisting of monoamines and polyamines, wherein a nitrogen is bonded to said Ti atom.

12. A composite material according to claim 11, wherein said other of $R_5$, $R_6$, $R_7$ and $R_8$ are each a polyamine having the formula —NH—[$(CH_2)_{aa}$—NH]$_{bb}$—$(CH_2)_{aa}$—$NH_2$, wherein aa is an integer from 1–10 and bb is an integer from 0–20.

13. A composite material according to claim 12, wherein $R_7$ and $R_8$ are SUPPORT—O— and $R_5$ and $R_6$ are the same.

14. A method of making a composite material suitable for removing heavy metal ions from fluid waste streams comprising the steps of:
providing an inorganic substrate having a terminal hydroxy group;
covalently attaching a titanizing agent to the oxygen of said terminal hydroxy group; and
covalently attaching an amine to titanium atoms of said titanizing agent.

15. A method according to claim 14, wherein said titanizing agent is titanium(IV) chloride and said amine is n-butylamine.

16. A composite material suitable for removing heavy metals from waste streams having the formula:

 (II)

wherein
1) at least one of $R_9$, $R_{10}$ or $R_{11}$ is SUPPORT—O— and $R_{12}$ is

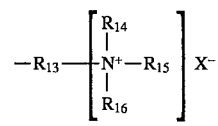

wherein:
a) $R_{13}$ is
i) an unsubstituted or lower aryl or lower alkyl substituted saturated hydrocarbon chain having 1–20 carbon atoms, ii) 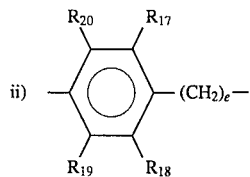

wherein $R_{17}$-$R_{20}$ are the same or different and are —H or —(CH$_2$)$_f$CH$_3$, where f is an integer from 0–20 and e is an integer from 1–5, or iii) 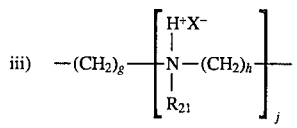

wherein $R_{21}$ is (CH$_2$)$_m$CH$_3$,

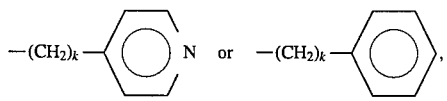

and g is 1–10, h is 1–10, j is 1–20, k is 1–5, m is 0–10, and X$^-$ is a chlorine, bromine or iodine ion;

b) two or three of $R_{14}$, $R_{15}$ and $R_{16}$ are —(CH$_2$)$_m$CH$_3$,

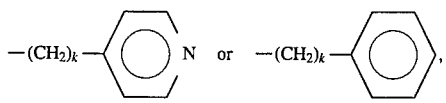

and other of $R_{14}$, $R_{15}$ and $R_{16}$ are H; and 2) other of $R_9$, $R_{10}$ and $R_{11}$ are $R_{12}$ or unsubstituted or halo-substituted alkyl groups having from 1–5 carbon atoms.

17. A composite material according to claim 16, wherein $R_9$, $R_{10}$ and $R_{11}$ are SUPPORT—O—, $R_{13}$ is —(CH$_2$)$_3$ and $R_{14}$, $R_{15}$ and $R_{16}$ are —CH$_3$.

18. A method of making a composite material suitable for removing heavy metal ion from fluid waste streams comprising the steps of:
providing an inorganic substrate having terminal hydroxyl groups;
providing a quaternary amine containing silane compound; and
covalently attaching said quaternary amine containing silane compound to the oxygen of said terminal hydroxyl group.

19. A method according to claim 18, wherein said quaternary amine containing silane compound is triethoxysilylpropyltrimethyl ammonium chloride. ammonium chloride.

20. A composite material suitable for removing heavy metals from waste streams having the formula:

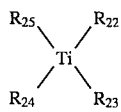 (IV)

wherein
1) one or both of $R_{24}$ and $R_{25}$ is SUPPORT—O— and other of $R_{22}$, $R_{23}$, $R_{24}$ and $R_{25}$ are the same or different and are a) 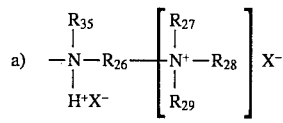

wherein
i) $R_{26}$ is
a) an unsubstituted or lower aryl or lower alkyl substituted saturated hydrocarbon chain having 1–20 carbon atoms, or b) 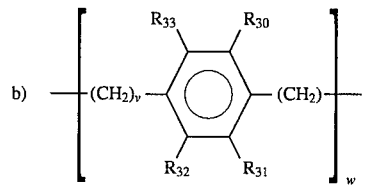

wherein v is an integer from 0–5, w is an integer from 1–5, $R_{30}$-$R_{33}$ are the same or different and are —H or —(CH$_2$)$_d$CH$_3$ wherein d is an integer from 0–20 or c) 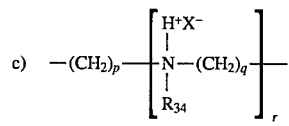

wherein $R_{34}$ is

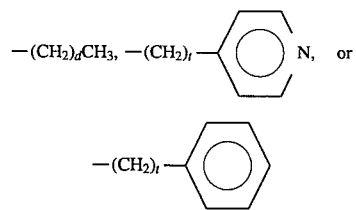

wherein p and q are the same or different and each is an integer from 1–10, r is an integer from 1–20, t is an integer from 1–5 and X$^-$ is a chlorine, bromine, or iodine ion; and
ii) $R_{35}$ and two of $R_{27}$, $R_{28}$ and $R_{29}$ are

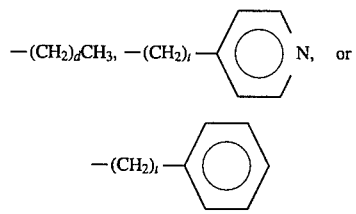

and other of $R_{27}$, $R_{28}$ and $R_{29}$ are H; or b) 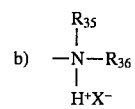

wherein $R_{35}$ is as defined above and $R_{36}$ is
i) an unsubstituted or lower alkyl or lower aryl substituted, saturated hydrocarbon chain having 1–20 carbon atoms; or ii) 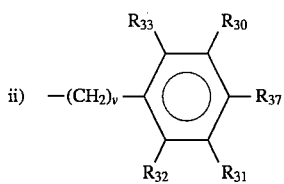

wherein $R_{30}$-$R_{33}$ and $R_{37}$ are the same or different and are —H or —$(CH_2)_u CH_3$ wherein u is an integer from 0–20.

21. A method of making a composite material suitable for removing heavy metal ions from fluid waste streams comprising the steps of:

providing an inorganic substrate having a terminal hydroxy group;

covalently attaching a titanizing agent to the oxygen of said terminal hydroxy group;

covalently attaching an amine to titanium atoms of said titanizing agent; and covalently attaching a halosubstituted hydrocarbon to a nitrogen atom of said amine.

\* \* \* \* \*